3,842,140
HF ALKYLATION OF ISOPARAFFIN WITH OLEFIN HEAVIER THAN ETHYLENE WITH ETHYL FLUORIDE AS REACTION IMPROVER

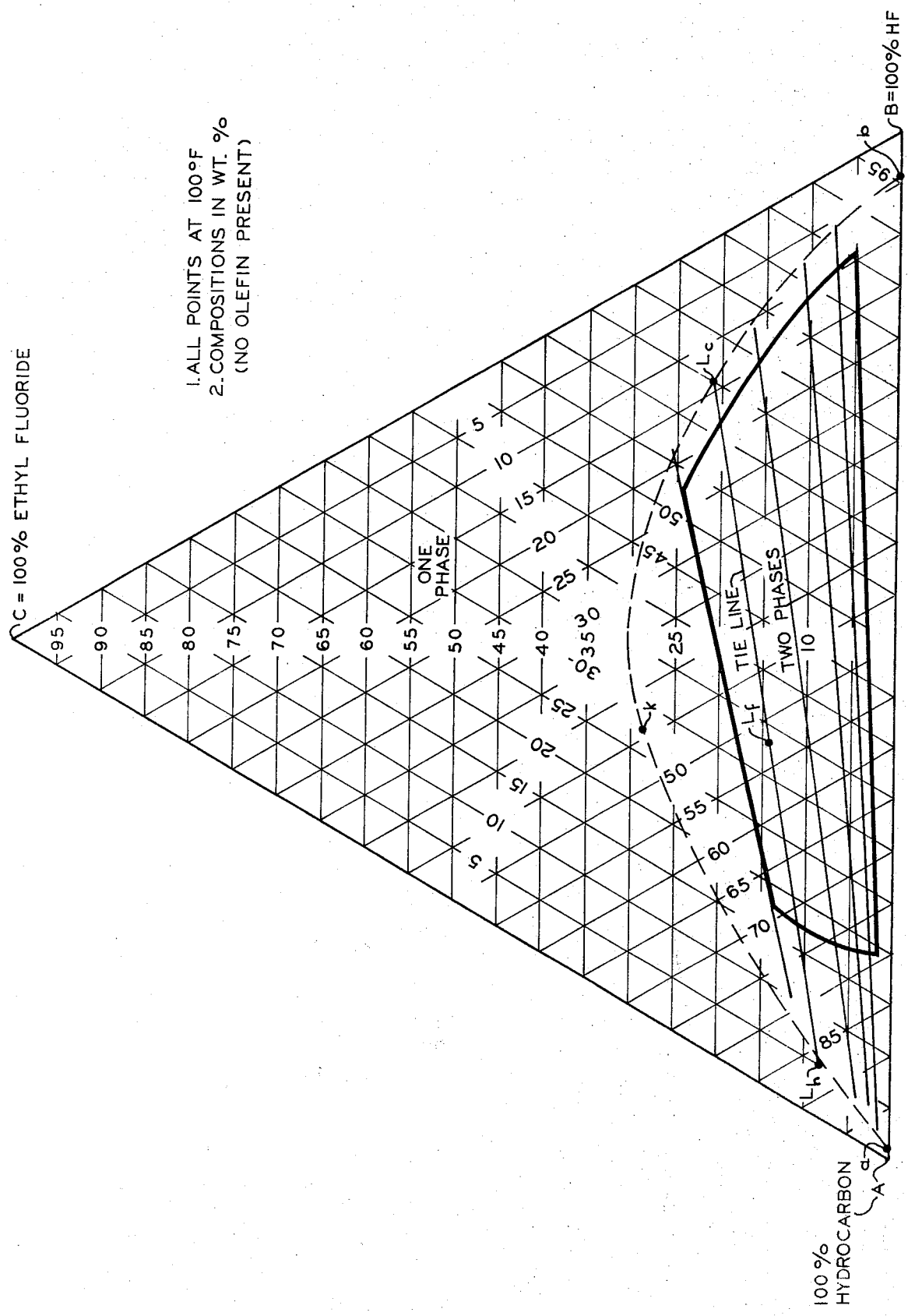

Thomas Hutson, Jr, and Cecil O. Carter, Bartlesville, Okla., assignors to Phillips Petroleum Company
Continuation-in-part of application Ser. No. 217,665, Jan. 13, 1972. This application Sept. 22, 1972, Ser. No. 291,372
Int. Cl. C07c 3/54
U.S. Cl. 260—683.51     12 Claims

ABSTRACT OF THE DISCLOSURE

Ethyl fluoride present in the system HF catalyst improves the reaction permitting advantageous alkylation of isoparaffin with olefin higher than ethylene. The ethyl fluoride is either generated in situ or added as such at a convenient place with the improver or modifier in amounts, say, in the general range of from about 5 to about 30–35 percent weight based on the total HF catalyst containing the same, the ethyl fluoride will yield the same octane values at considerably lower than conventional isoparaffin to olefin ratios or at such conventional ratios will increase the octane number or value of the product. Yields of desirable alkylate are improved. Thus, at comparable ratios of reactants, the yield obtained of high octane alkylate, which has an octane considerably better than that obtained without the ethyl fluoride, e.g. an increase of about three numbers, Research clear, is increased, e.g. 98 percent as compared with about 80 percent, the ratio of reactants isobutane and propylene for the specific values here given having been 11.6:1 with the ethyl fluoride and 9.8:1 without the modifier. With same reactants at a ratio of 11.6:1 octane was substantially the same as with ethyl fluoride in the system catalyst, added thereto, as it was at 34:1 without ethyl fluoride, e.g. it was 93.4 RON clear with ethyl fluoride and 92.6 RON clear without ethyl fluoride. Moreover, with ethyl fluoride at the lower ratio the yield of motor alkylate was higher than with the much higher ratio, i.e. 98 percent at 11.6:1 with the ethyl fluoride and only 93.5 at 34:1 without ethyl fluoride.

Presently, with regard to the boiling range and octane values of the produced alkylates the now preferred ethyl fluoride is at least about 7.5 percent weight of the total HF catalyst.

Similar results, yields and alkylate qualities are obtained with mixtures of isoparaffin, e.g. isobutane and/or isopentane with mixtures of olefins, e.g. propylene and butylenes.

---

This is a continuation-in-part application of our copending application having Ser. No. 217,665, filed Jan. 13, 1972, now abandoned.

This invention relates to the alkylation of an isoparaffin with an olefin. It also relates to the alkylation of an isoparaffin with an olefin in the presence of an improver or modifier in the system catalyst to produce improved yields and quality of hydrogen fluoride catalyzed motor fuel alkylate. Further, the invention relates to the modification of a hydrogen fluoride alkylation catalyst.

In one of its concepts, the invention provides the presence of ethyl fluoride in an isoparaffin-olefin hydrogen fluoride catalyzed alkylation reaction, the ethyl fluoride being present in an amount of from about 5, preferably about 7.5, to about 30–35 weight percent based upon the total system catalyst, including the fluoride, which permits the alkylation in which olefins higher or heavier than ethylene are employed or used to give increased yields and/or quality of alkylate, as judged by octane values, at conventional ratios of isoparaffin to olefin or the obtaining of the same octane value and yields, if not higher yields, at substantially lower ratios of isoparaffin to olefin reactants. In another of its concepts, the invention provides a process as herein described which permits advantageously the reduction of the size of equipment required to segregate and to recycle the isoparaffin within the system.

In another concept of the invention, the ethyl fluoride is added to the system at a convenient place as into the acid or into the hydrocarbon phase or it is generated in situ by addition of ethylene together with the feed, for example, together with the olefinic feed or into the acid or hydrocarbon phase at a convenient place, or, as desired, the ethyl fluoride can be in part added as such and/or as ethylene.

We have now discovered that the presence of ethyl fluoride in the system when alkylating an isoparaffin, for example, isobutane and/or isopentane with an olefin heavier or higher than ethylene, for example, propylene and/or butylenes and/or amylenes, etc., that it is possible to considerably reduce the external ratio or feed ratio of isoparaffin to olefin to the process. This results in considerable savings of construction and operation costs in that the amount of isoparaffin required to be segregated and recycled is considerably reduced.

Thus, we have found that ethyl fluoride present in the system, added thereto and/or generated in situ, as herein described, it is possible to obtain at conventional ratios of isoparaffin/olefin reactants considerably higher yields and higher octane values than heretofore or, alternatively, at lower reactant ratios to obtain the same if not higher yields and the same octane values as obtained heretofore with the conventional ratios of reactants.

An object of this invention is to provide a process for the alkylation of an isoparaffin with an olefin. Another object of this invention is to provide for the modification of a conventional isoparaffin/olefin alkylation process in which the olefin alkylated is higher or heavier than ethylene. Another object of the invention is to provide an improved alkylation process in which an isoparaffin is alkylated with an olefin heavier than ethylene to obtain higher yields and/or higher octane values. Still further object of the invention is to provide a process in which it is possible to obtain the same, if not higher yields and the same octane values in the alkylation of an isoparaffin with an olefin but at reduced reactant ratios. A further object is to provide a more intimate physical or chemical contact or reaction in the alkylation of an isoparaffin. Another object of the invention is to permit reduction in the cost of fractionation of isoparaffin.

Other aspects, concepts, objects and the several advantages of this invention are apparent from a study of this disclosure and the appended claims.

According to the present invention, there is provided a process for the alkylation of an isoparaffin with an olefin heavier than ethylene which comprises alkylating said isoparaffin and olefin with hydrogen fluoride catalyst, there being present in the system a minor amount of ethyl fluoride.

Also according to the invention, the ethyl fluoride can be provided in situ as by adding ethylene to the operation at a convenient place as with the reactants or with the acid phase or to the acid phase or by adding externally produced ethyl fluoride. Still further, according to the invention, the amount of ethyl fluoride ordinarily present in the system will be from about 5 to about 30–35 weight percent based upon the system catalyst, including in the system catalyst the amount of ethyl fluoride therein. Thus, in calculating the amount of ethyl fluoride to be added to the system it is to be upon analysis of the system catalyst from about 5, preferably about 7.5, to about 30–35 weight percent thereof.

The ratios of the isoparaffin-olefin heavier than ethylene reactants will ordinarily be in the range of from about 2:1 to about 100:1, preferably 10:1 to 15:1, still more preferably from about 11:1 to about 14:1, on a mol basis.

The isoparaffins to which the process of the invention is particularly applicable are isobutane and/or isopentane. The olefins which are advantageously alkylated are propylene, the butylenes, amylenes. Small quantities of other olefins can be present in the olefinic feed. However, this is not now preferred.

The temperature in the alkylation reaction zone which can be continuously or batchwise operated but is now preferably continuously operated will be from about 35° F. to about 200° F., preferably from about 70° F. to about 120° F., with a temperature usually in the neighborhood of approximately 100° F. being quite satisfactory.

The catalyst/hydrocarbon volume ratio will usually be in the range of from about ¼:1 to about 20:1. Now preferred catalyst to hydrocarbon volume ratio will be in the range of from about 2:1 to about 10:1, a more preferred value being in the neighborhood of about 4:1.

The pressure will normally be sufficient to maintain subtantially all of the reactants essentially in liquid phase. This pressure will be usually at least about 160 p.s.i.g. Pressures lower can be employed, but are not now preferred. In runs reported herein in which desirable results have been obtained the pressure was of the order of about 190 p.s.i.g.

Contact times will range from about 10 seconds to about 10 minutes, usually about 1 minute will suffice.

It will be understood by one skilled in the art in possession of this disclosure that the essence of the invention is in the finding that ethyl fluoride being present during the reaction permits considerable modification very advantageously to increase yields and/or octane values and that the conditions selected by him can be determined to be optimum for any set of reactants or other reasons by mere routine tests.

Usually on start-up, ethyl fluoride and/or ethylene is added continuously to the system at a desired place as with the reactants or into the acid or hydrocarbon phase until the desired quantity of ethyl fluoride is present in the system. Thereafter, usually, only enough ethyl fluoride and/or ethylene will be added to maintain the preselected level of ethyl fluoride in the system. In other words, the results of the present inventive concepts are best obtained in the absence of free ethylene. Ethylene when added to produce the fluoride in situ does not appear to alkylate the isoparaffin to any appreciable extent, as determined by analyzing for diisopropyl. Of course, during the build-up to the desired amount of $C_2H_5F$ in the catalyst phase, there may be some alkylation of the isoparaffin by ethylene. Accordingly, the addition of ethylene is carefully conducted to keep the concentration thereof low, usually as low as 5 weight percent, preferably lower. Further, it is now preferred to add a prior formed ethylfluoride thus to avoid entirely any ethylene alkylation. In serial number 138,991, filed by us April 30, 1971, the ethylene is alkylated. In the present application the ethylfluoride is added as a catalyst modifier. It will be noted that in the present invention, the use of ethylene procures benefits all the while the amounts used are considerably smaller than required in those cases in which ethylene is converted to alkylate.

Combinations of ethylene and ethyl fluoride can be used as noted herein.

Although not wishing to be bound thereby, it would now appear that the ethyl fluoride increases the solubility of the isoparaffin e.g., isobutane in the HF catalyst, as shown in the data, so that in the effect obtained the results are like those which normally are obtained only with a very high internal ratio of isobutane to olefin. Thus, this advantage is realized albeit there is employed a considerably lower external isobutane to olefin ratio and less isobutane needs to be recycled. Thus, when no ethyl fluoride is present, the external isobutane to olefin ratio must be higher and more isoparaffin recycling is needed to obtain the same kind and quality of alkylate or quantity of alkylate than when ethyl fluoride is present. The alkyl fluoride here discussed permits obtaining high octane values at relatively low external isoparaffin to olefin ratios. One skilled in the art can readily select the amount of ethyl fluoride for any selected external isoparaffin/olefin ratio.

The data tabulated below fully illustrate our invention. The olefin feeds used in the runs in Table I, Table II, and Table III, respectively, were: propylene; a 50–50 volume mixture of propylene and isobutylene; and a refinery olefin-containing stream including propylene, butylenes, and some amylenes, tabulated hereinbelow in Table III.

All runs were made using liquid hydrocarbon phase and liquid HF catalyst phase, liquid phases now being preferred.

In each run, HF catalyst was added to the reaction vessel and the hydrocarbon phase (olefins, isobutane, and different quantities of ethyl fluoride, $C_2H_5F$) was contacted with the catalyst phase. Nozzles located in the lower portion of the catalyst phase were used to charge the hydrocarbon phase to insure intimate contact between the hydrocarbon and catalyst liquid phases. In operation of the invention the catalyst present and acting in the reaction zone upon the hydrocarbons therein will contain, as such, the desired, specified weight percent of $C_2H_5F$. This will be so whether batch, semi-continuous or continous operation is being conducted.

The amount of ethyl fluoride, which is the now preferred primary alkyl fluoride, used was less than that amount which produces a single liquid phase of the reaction mass of catalyst and hydrocarbon. Our presently preferred operation uses ethyl fluoride in an amount so that the two phases, hydrocarbon phase and HF catalyst phase, exist in the system.

Secondary and tertiary alkyl fluoride cannot be used to activate our system since they react out in the reaction zone, usually existing only in the amount of a few parts per million range in the reaction zone.

In all runs, the hydrocarbon phase was recovered and fractionated to produce debutanized alkylate which was analyzed for octane, distillation, etc.

Preferably, the water content of the HF catalyst phase is maintained below about 10 weight percent, and more preferably, below about 5 weight percent. The acid soluble oils (ASO) content of the HF catalyst is preferably maintained at less than about 5 weight percent, more preferably, below about 3 weight percent of the HF catalyst phase. A conventional HF catalyst rerun unit can be used to effect the removal of the desired amounts of water and of acid soluble oils from the HF catalyst phase. Normally, a slip stream of catalyst is removed from the reaction zone and passed to the rerun unit, either continuously or intermittently.

The ranges of ethyl fluoride weight percent of the HF catalyst will be recognized by one skilled in the art to be somewhat approximate. If water and/or acid soluble oil are present when the ethyl fluoride is being added to the catalyst system, to the extent water and ASO may be significantly present, their presence should be taken into account. The data herein were obtained with a small amount of water, as such, and with practically insignificant amounts of ASO.

In the runs in the tables, it will be seen the amounts of water and ASO are small, if the lower value of about 5 percent ethyl fluoride is taken then the actual ethyl fluoride is about 97 percent of 5=4.85 i.e. 4.85 percent ethyl fluoride of the total HF catalyst when 3 percent weight of water is present. A similar calculation can be made when ASO is taken into account. Thus, with 2 percent ASO and 3 percent water the value for $C_2H_5F$ will be $0.95 \times 5 = 4.75$ i.e. the weight percent $C_2H_5F$ will be 4.75 percent. The preferred value of about 7.5 percent weight herein given is well above those which would result when water and/or ASO are significantly present.

TABLE I

| | Run number | | |
|---|---|---|---|
| | 1 | 2 | 3 |
| Reactor temperature, °F | 95 | 90 | 94 |
| Isobutane/propylene mol ratio | 11.6:1 | 9.8:1 | 34.1:1 |
| $C_2H_5F$ charged, wt. percent of propylene | 51.4 | 0 | 0 |
| Catalyst composition: | | | |
| $H_2O$, wt. percent | 0.7 | 2.0 | 2.1 |
| HF, wt. percent | 69.6 | 90.4 | 94.4 |
| Isobutane, wt. percent [a] | 8.5 | 3.5 | 3.5 |
| Acid sol. oils, wt. percent | 0.03 | 0.7 | 0.02 |
| Ethyl fluoride ($C_2H_5F$), wt. percent | 21.3 | 0 | 0 |
| Reactor Pressure | (To maintain liquid phases) | | |
| Contact time, seconds | 68 | 60 | 65 |
| Catalyst/total hydrocarbon (vol.) | 4:1 | 4:1 | 4:1 |
| Alkylate product ($iC_5$ and heavier): | | | |
| Reid vapor pressure, p.s.i. | 4.00 | 4.18 | 3.34 |
| End point, °F | 324 | 456 | 353 |
| Vol. percent motor fuel alkylate | 97.73 | 78.61 | 93.49 |
| Research octane (0 TEL) | 93.4 | 87.8 | 92.6 |
| Motor octane (0 TEL) | 91.8 | 87.7 | 91.0 |
| Research octane (3 cc. TEL) | 107.8 | 104.0 | 107.1 |
| Motor octane (3 cc. TEL) | 107.5 | 104.0 | 106.4 |

[a] Includes small amounts of propane and normal butane.

From the data in the above Table I, it can be seen that the invention Run 1, at 11.6:1 isobutane to olefin mol ratio, using ethyl fluoride to activate the system, produced a motor fuel alkylate of higher octane number and in a higher yield than the alkylate produced in Run 3 wherein no ethyl fluoride was used, but wherein the isobutane to olefin mol ratio was extremely high at 34.1:1. Run 2, using no ethyl fluoride and using an isobutane to olefin mol ratio of 9.8, approximately the ratio of Run 1, produced very low octane number and very low yield of motor fuel alkylate. Run 2 produced a 456° F. end point alkylate of which only about 78.6 weight percent was motor fuel alkylate (at maximum end point of 400° F.).

TABLE II

| | Run number | |
|---|---|---|
| | 4 | 5 |
| Reactor temperature, °F | 149 | 146 |
| Isobutane/olefins mol ratio | 11.4:1 | 12.1:1 |
| $C_2H_5F$, wt. percent of olefins | 0 | 55.5 |
| Catalyst composition: | | |
| $H_2O$, wt. percent | 0.9 | 1.4 |
| HF, wt. percent | 85.1 | 68.3 |
| Isobutane, wt. percent [a] | 4.0 | 9.2 |
| Acid sol. oils, wt. percent | 0.1 | 0.02 |
| $C_2H_5F$, wt. percent | 0 | 21.0 |
| Reactor pressure | (To maintain liquid phases) | |
| Contact time, seconds | 53 | 90 |
| Catalyst/total hydrocarbon (vol.) | 4:1 | 4:1 |
| Alkylate product ($iC_5$ and heavier): | | |
| Reid vapor pressure, p.s.i. | 9.2 | 4.6 |
| End point, °F | 373 | 358 |
| Research octane (0 TEL) | 87.3 | 90.4 |
| Motor octane (0 TEL) | 86.1 | 89.4 |
| Research octane (3 cc. TEL) | 100.7 | 104.0 |
| Motor octane (3 cc. TEL) | 102.6 | 104.9 |

[a] Includes small amounts of propane and normal butane.

Runs 4 and 5 used approximately the same isobutane/olefins mol ratios, but Run 5 of the invention, using ethyl fluoride in the system, produced much higher octane alkylate.

TABLE III

The plant olefin stream had the following composition:

| Component | Wt. percent | Wt. percent (paraffin-free) |
|---|---|---|
| Ethane | 0.0 | 0 |
| Propane | 5.4 | 0 |
| Propylene | 18.0 | 40.69 |
| Isobutane | 37.9 | 0 |
| Normal butane | 5.9 | 0 |
| Isobutylene and butene-1 | 12.5 | 28.25 |
| trans-Butene-2 | 6.1 | 13.79 |
| cis-Butene-2 | 4.3 | 9.72 |
| Isopentane | 3.3 | 0 |
| 3-methyl butene-1 | 0.5 | 1.22 |
| Normal pentane | 0.4 | 0 |
| Heavier than n-pentane [a] | 5.7 | 6.33 |
| Total | 100.0 | 100.00 |

TABLE III—Continued

| Run number | 6 | 7 | 8 | 9 | 10 | 11 | 12 |
|---|---|---|---|---|---|---|---|
| Reactor temperature, °F | 92 | 91 | 90 | 95 | 92 | 95 | 93 |
| Isobutane/olefin mol ratio | 13.8:1 | 12.9:1 | 12.2:1 | 13:1 | 12.2:1 | 13:1 | 13.7:1 |
| $C_2H_5F$ charged, wt. percent of olefin | 0 | 19.5 | 44.1 | 46 | 62 | 62.5 | 71.2 |
| Catalyst composition: | | | | | | | |
| $H_2O$, Wt. percent | 0.5 | 1.0 | 0.7 | 0.5 | 0.6 | 0.9 | 0.9 |
| HF, wt. percent | 95.0 | 86.3 | 78.6 | 73.2 | 70.0 | 62.6 | 55.1 |
| Isobutane, wt. percent [a] | 3.4 | 5.1 | 7.0 | 8.5 | 9.3 | 13.0 | 17.2 |
| Acid sol. oils, wt. percent | 0.3 | 0.2 | 0.3 | 0.3 | 0.4 | 0.4 | 0.1 |
| $C_2H_5F$, wt. percent | 0 | 7.4 | 13.2 | 17.5 | 19.6 | 23.1 | 26.7 |
| Reactor pressure | (To maintain liquid phases) | | | | | | |
| Alkylate product ($iC_5$ and heavier): | | | | | | | |
| Reid vapor pressure, p.s.i. | 6.4 | 5.3 | 4.6 | 4.9 | 4.9 | 5.2 | 5.1 |
| End point, °F | 422 | 408 | 382 | 366 | 371 | 378 | 370 |
| Research octane (0 TEL) | 88.4 | 90.1 | 91.3 | 91.8 | 91.6 | 91.9 | 92.3 |
| Motor octane (0 TEL) | 88.1 | 89.8 | 90.7 | 90.8 | 90.6 | 91.0 | 91.1 |
| Volume alkylate/volume olefin | 1.8 | 1.8 | 1.8 | 1.8 | 1.8 | 1.8 | 1.8 |

[a] Includes amylenes.
[b] Includes a small amount of propane and normal butane.

In Runs 6 through 12, contact times were about one minute, and the catalyst to total hydrocarbon volume ratios were approximately 4:1.

Run 6, a run not within the scope of the claimed invention, using no ethyl fluoride and using an isobutane to olefin mol ratio of 13.8:1, produced the lowest octane number motor fuel alkylate. A zero TEL octane of less than about 90, with an allowance according to ASTM testing methods of a variation of 0.5 octane in test results, is not desirable according to the present invention. Hence, the limitation to at least about 5 weight percent $C_2H_5F$. Runs 7 through 12 demonstrate the octane improvement using ethyl fluoride, a primary alkyl fluoride, in the HF alkylation system. Run 6 produced the smallest quantity of motor fuel alkylate (end point was 422° F.) of all of the runs. As noted, run 6 is outside the scope of the claimed invention.

In all runs using ethyl fluoride, it can be seen that as the amount of ethyl fluoride in the HF catalyst phase is increased, that the isobutane content of the HF catalyst phase is also increased. It is believed that the higher octanes are realized by our invention because of the improved hydrocarbon (e.g., isobutane) solubility in the catalyst phase, which solubility increase is afforded by the presence of ethyl fluoride in the HF catalyst phase. The removal of ethyl fluoride from the hydrocarbon phase upon settling of the reactor effluent can be accomplished by fractionation as one skilled in the art will understand. Ordinarily, the ethyl fluoride is removed along with propane and is recovered therefrom.

Referring now to the drawing, ranges of operation for the ethyl fluoride containing system are shown in the diagram. The plot is shown as an equilateral triangle but this plot can be made on a "right" triangle, if desired.

The minimum and maximum limits for ethyl fluoride concentration, weight percent ethyl fluoride in the catalyst phase, in the "two phase" system are 5 and about 35 weight percent, respectively. The upper limit preferably is about 30 weight percent, and still more preferably is about 25 weight percent ethyl fluoride.

The minimum and maximum volume ratios of HF catalyst phase to hydrocarbon phase are about 0.25 to 1 and about 20 to 1.

The trapezoidal-shaped area bounded by the heavy lines on the triangular plot is a two phase region for the broad ranges of operation of our invention.

The dashed curved line a-k-b is the solubility or binodal curve for the ternary system of HF-hydrocarbon ($iC_4$)-ethyl fluoride, at 100° F (isotherm). In the area above curve a-k-b, as marked, the HF-hydrocarbon-ethyl fluoride components are mutually soluble and form a single phase.

Below curve a-k-b, two phases exist, one is the hydrocarbon phase, the other is the HF catalyst phase. Both these phases contain ethyl fluoride, except on line A–B. At temperatures other than 100° F., curve a-k-b will be displaced.

The lines such as $L_H$–$L_C$ show at their ends, for feed compositions of any point therealong, the compositions of the phases into which the particular feed will separate and the lengths of the segments formed by said point will represent the ratio of the weights of the two phases.

The point $k$ represents the critical point at which the tie lines, e.g. $L_H$–$L_C$, disappear.

In determining the solubility data with aid of which the graph was plotted no olefin, which would have reacted, was present. The olefin was omitted to insure accurate representation of a very close approximation of condition at moment of bringing together isoparaffin, olefin acid and ethyl fluoride. Olefin omitted would, in any event, be but a small portion, reasonably ignored, of the total feed to the apparatus. Thus, the solubilities are substantially the same whether the olefin is present or absent.

For example, operating with a mixture of HF catalyst, olefin, isoparaffin, and ethyl fluoride of composition $L_F$ on tie-line $L_H$–$L_C$, on standing, two phases will form and will have composition $L_C$ (catalyst phase) and $L_H$ (hydrocarbon phase). The lines $L_H$–$L_F$ and $L_F$–$L_C$ represent the proportions of hydrocarbon and catalyst phases, respectively, by weight. The shaded area of the figure, determined at 100° F., approximately corresponds to the now preferred broadly expressed, feed mixtures. Obviously some slight variation will occur for different diagrams obtained at temperatures other than 100° F.

The shaded area corresponds to weight percentage range as follow: hydrofluoric acid, about 17 to about 86; ethyl fluoride, about 2 to about 25; and hydrocarbon, including olefin, about 9 to about 79.

Upon separating into two phases the phases will have approximate compositions as follow: the hydrocarbon-rich phase: hydrofluoric acid about 1 to about 8; ethyl fluoride about 1 to about 11; and hydrocarbon about 98 to about 81; and the HF-rich phase: hydrofluoric acid about 90 to about 56; ethyl fluoride about 5 to 26; and hydrocarbon about 5 to about 18.

Reasonable variation and modification are possible within the scope of the foregoing disclosure and appended claims to the invention, the essence of which is that it has been discovered that the presence of ethyl fluoride in the hydrogen fluoride alkylation is of an isoparaffin with an olefin heavier than ethylene considerably modifies and improves the alkylation reaction so that much lower ratios of isoparaffin to olefin reactants can be employed or alternatively at conventional ratios of reactants higher yields and higher octane values can be obtained.

We claim:

1. A process for the alkylation of at least one isoparaffin with at least one olefin wherein an admixture consisting essentially of HF catalyst, ethyl fluoride, and a hydrocarbon comprising a major portion of isoparaffin and a minor portion of olefin is subjected to alkylation employing in the alkylation reaction system the ethyl fluoride in an amount to be effective as an activator or modifier for the HF catalyst and wherein said admixture is defined by the trapezoidal area indicated in the 3-component diagram of the figure which area represents substantially the existence of a 2-phase system.

2. The process of claim 1 wherein the isoparaffin is selected from isobutane and isopentane and mixtures thereof the olefin is at least one selected from propylene and a butylene, which comprises employing in the alkylation reaction system at least about 5 percent by weight of the total HF present of ethyl fluoride as the activator or modifier for the HF-catalyzed reaction.

3. A process according to claim 2 wherein the ethyl fluoride is present in an amount in the range of from about 5 to about 30–35 percent by weight of the system catalyst.

4. A process according to claim 2 wherein the ethyl fluoride is present in an amount in the range of from about 7.5 to about 30–35 percent by weight of the system catalyst.

5. A process according to claim 2 wherein the isoparaffin to olefin ratio is the approximate range 2:1–100:1.

6. A process according to claim 2 wherein the isoparaffin to olefin ratio is in the approximate range 10:1–15:1.

7. A process according to claim 2 wherein the catalyst to hydrocarbon ratio is in the range of from ¼:1 to about 20:1, by volume.

8. A process according to claim 2 wherein the ethyl fluoride concentration is maintained by adding it as such to the system.

9. A process according to claim 2 wherein the ethyl fluoride concentration is maintained by adding a small amount of ethylene to generate it in situ.

10. A process according to claim 2 wherein the weight percentages of feed components are hydrofluoric acid, about 17 to about 86, ethyl fluoride, about 2 to about 25, and hydrocarbon, including olefin, about 9 to about 79.

11. A process according to claim 2 in which when the reaction has been effected the phases which can be separated have compositions in weight percent as follow: hydrocarbon-rich phase: hydrofluoric acid about 1 to about 8; ethyl fluoride about 1 to about 11; and hydrocarbon about 98 to about 81; and HF-rich phase: hydrofluoric acid about 90 to about 56; ethyl fluoride about 5 to 26; and hydrocarbon about 5 to about 18.

12. A process according to claim 1 wherein the ethyl fluoride is generated in situ by at start-up adding to the reaction system ethylene at least until a desired quantity of ethyl fluoride has been generated, thereafter discontinuing such addition while maintaining the desired ethyl fluoride concentration by adding only sufficent ethylene and/or ethyl fluoride to the system to generate additional ethyl fluoride to maintain and concentration.

References Cited

UNITED STATES PATENTS

| | | | |
|---|---|---|---|
| 2,387,162 | 10/1945 | Matuszak | 260—683.48 |
| 3,253,054 | 5/1966 | Van Pool | 260—683.51 |
| 3,209,051 | 9/1965 | Bauer et al. | 260—683.48 |
| 3,751,517 | 8/1973 | Hutson, Jr. et al. | 260—683.48 |

DELBERT E. GANTZ, Primary Examiner

G. J. CRASANAKIS, Assistant Examiner